US007258179B2

(12) United States Patent
Hall

(10) Patent No.: US 7,258,179 B2
(45) Date of Patent: Aug. 21, 2007

(54) ROTARY BIT WITH AN INDENTING MEMBER

(76) Inventor: David R. Hall, 2185 S. Larsen Pkwy., Provo, UT (US) 84606

( * ) Notice: Subject to any disclaimer, the term of this patent is extended or adjusted under 35 U.S.C. 154(b) by 0 days.

(21) Appl. No.: 11/421,838

(22) Filed: Jun. 2, 2006

(65) Prior Publication Data

US 2007/0114071 A1 May 24, 2007

Related U.S. Application Data

(63) Continuation of application No. 11/306,307, filed on Dec. 22, 2005, now Pat. No. 7,225,886, which is a continuation-in-part of application No. 11/306,022, filed on Dec. 14, 2005, now Pat. No. 7,198,119, which is a continuation-in-part of application No. 11/164, 391, filed on Nov. 21, 2005.

(51) Int. Cl.
*E21B 10/04* (2006.01)
(52) U.S. Cl. ...................... 175/404; 175/381; 175/385; 175/405.1; 175/426
(58) Field of Classification Search ................ 175/404, 175/403, 405.1, 408, 420.2, 385, 386, 379, 175/381, 415, 420.1, 426
See application file for complete search history.

(56) References Cited

U.S. PATENT DOCUMENTS

| 465,103 A | 12/1891 | Wegner |
| 616,118 A | 12/1898 | Kunhe |
| 946,060 A | 1/1910 | Looker |
| 1,116,154 A | 11/1914 | Stowers |
| 1,183,630 A | 5/1916 | Bryson |
| 1,189,560 A | 7/1916 | Gondos |
| 1,360,908 A | 11/1920 | Everson |
| 1,372,257 A * | 3/1921 | Swisher ...................... 175/381 |
| 1,387,733 A | 8/1921 | Midgett |
| 1,460,671 A | 7/1923 | Hebsacker |
| 1,544,757 A | 7/1925 | Hufford |
| 1,821,474 A | 9/1931 | Mercer |
| 1,836,638 A * | 12/1931 | Wright et al. ............... 175/333 |
| 2,054,255 A | 9/1936 | Howard |
| 2,169,223 A | 8/1939 | Christian |
| 2,218,130 A | 10/1940 | Court |
| 2,320,136 A | 5/1943 | Kammerer |
| 2,375,335 A * | 5/1945 | Walker ...................... 175/259 |
| 2,466,991 A | 4/1949 | Kammerer |
| 2,540,464 A | 2/1951 | Stokes |
| 2,544,036 A | 3/1951 | Kammerer |
| 2,619,325 A * | 11/1952 | Arutunoff .................... 175/107 |

(Continued)

*Primary Examiner*—Hoang Dang
(74) *Attorney, Agent, or Firm*—Tyson Wilde

(57) ABSTRACT

In one aspect of the invention a drill bit assembly has a body portion intermediate a shank portion and a working portion. The working portion has a recess with a side wall which is substantially coaxial with the shank portion. At least one cutting element is attached to the side wall and an indenting member is disposed within the closed end. In another aspect of the invention a method includes providing a drill bit assembly with a recess formed in a working portion of the assembly. The working portion has a plurality of cutting elements and the recess has at least one cutting element. The method further has steps of cutting a formation with the plurality of cutting elements and also of penetrating a conical profile of the formation which is formed by the recess.

11 Claims, 9 Drawing Sheets

U.S. PATENT DOCUMENTS

| | | | | |
|---|---|---|---|---|
| 2,626,780 A | * | 1/1953 | Ortloff | 175/107 |
| 2,755,071 A | | 7/1956 | Kammerer | |
| 2,776,819 A | * | 1/1957 | Brown | 175/389 |
| 2,873,093 A | * | 2/1959 | Hildebrandt et al. | 175/92 |
| 2,894,722 A | * | 7/1959 | Buttolph | 175/45 |
| 2,901,223 A | | 8/1959 | Scott | |
| 2,963,102 A | | 12/1960 | Smith | |
| 3,055,443 A | * | 9/1962 | Edwards | 175/405.1 |
| 3,077,936 A | * | 2/1963 | Arutunoff | 175/101 |
| 3,294,186 A | * | 12/1966 | Buell | 175/420.1 |
| 3,301,339 A | * | 1/1967 | Pennebaker, Jr. | 175/387 |
| 3,346,060 A | * | 10/1967 | Beyer | 175/426 |
| 3,379,264 A | | 4/1968 | Cox | |
| 3,387,673 A | * | 6/1968 | Thompson | 175/96 |
| 3,429,390 A | * | 2/1969 | Bennett | 175/343 |
| 3,433,331 A | * | 3/1969 | Heyberger | 175/405.1 |
| 3,493,165 A | | 2/1970 | Schonfield | |
| 3,635,296 A | * | 1/1972 | Lebourg | 175/404 |
| 3,765,493 A | * | 10/1973 | Rosar et al. | 175/319 |
| 3,885,638 A | * | 5/1975 | Skidmore | 175/390 |
| 3,960,223 A | | 6/1976 | Kleine | |
| 4,081,042 A | | 3/1978 | Johnson | |
| 4,106,577 A | | 8/1978 | Summer | |
| 4,207,964 A | * | 6/1980 | Taguchi | 181/284 |
| 4,280,573 A | * | 7/1981 | Sudnishnikov et al. | 175/418 |
| 4,304,312 A | * | 12/1981 | Larsson | 175/400 |
| 4,307,786 A | | 12/1981 | Evans | |
| 4,416,339 A | | 11/1983 | Baker | |
| 4,448,269 A | | 5/1984 | Ishikawa | |
| 4,531,592 A | | 7/1985 | Hayatdavoudi | |
| 4,535,853 A | * | 8/1985 | Ippolito et al. | 175/404 |
| 4,566,545 A | | 1/1986 | Story | |
| 4,640,374 A | * | 2/1987 | Dennis | 175/393 |
| 4,852,672 A | * | 8/1989 | Behrens | 175/389 |
| 4,962,822 A | | 10/1990 | Pascale | |
| 5,009,273 A | | 4/1991 | Grabinski | |
| 5,038,873 A | | 8/1991 | Jurgens | |
| 5,141,063 A | | 8/1992 | Quesenbury | |
| 5,361,859 A | | 11/1994 | Tibbitts | |
| 5,417,292 A | | 5/1995 | Polakoff | |
| 5,507,357 A | | 4/1996 | Hult | |
| 5,560,440 A | | 10/1996 | Tibbitts | |
| 5,568,838 A | | 10/1996 | Struthers | |
| 5,678,644 A | | 10/1997 | Fielder | |
| 5,794,728 A | * | 8/1998 | Palmberg | 175/400 |
| 5,896,938 A | | 4/1999 | Moeny | |
| 5,947,215 A | * | 9/1999 | Lundell | 175/417 |
| 6,131,675 A | * | 10/2000 | Anderson | 175/268 |
| 6,202,761 B1 | | 3/2001 | Forney | |
| 6,439,326 B1 | | 8/2002 | Huang | |
| 6,533,050 B2 | | 3/2003 | Molloy | |
| 6,601,454 B1 | | 8/2003 | Botnan | |
| 6,668,949 B1 | | 12/2003 | Rives | |
| 6,732,817 B2 | | 5/2004 | Dewey | |
| 6,929,076 B2 | | 8/2005 | Fanuel et al. | |
| 6,953,096 B2 | * | 10/2005 | Gledhill et al. | 175/57 |
| 2003/0213621 A1 | * | 11/2003 | Britten et al. | 175/404 |

* cited by examiner

ROTARY BIT WITH AN INDENTING MEMBER

CROSS REFERENCE TO RELATED APPLICATIONS

This application is a continuation of U.S. patent application Ser. No. 11/306,307 filed on Dec. 22, 2005, now U.S. Pat. No. 7,225,886 entitled Drill Bit Assembly with an Indenting Member. Patent application Ser. No. 11/306,307 is a continuation-in-part of U.S. patent application Ser. No. 11/306,022 filed on Dec. 14, 2005, now U.S. Pat. No. 7,198,119 entitled Hydraulic Drill Bit Assembly. U.S. patent application Ser. No. 11/306,022 is a continuation-in-part of U.S. patent application Ser. No. 11/164,391 filed on Nov. 21, 2005, which is entitled Drill Bit Assembly. All of these applications are herein incorporated by reference in their entirety.

BACKGROUND OF THE INVENTION

This invention relates to drill bits, specifically drill bit assemblies for use in oil, gas and geothermal drilling. Often drill bits are subjected to harsh conditions when drilling below the earth's surface. Replacing damaged drill bits in the field is often costly and time consuming since the entire downhole tool string must typically be removed from the borehole before the drill bit can be reached. Bit whirl in hard formations may result in damage to the drill bit and reduce penetration rates. Further loading too much weight on the drill bit when drilling through a hard formation may exceed the bit's capabilities and also result in damage. Too often unexpected hard formations are encountered suddenly and damage to the drill bit occurs before the weight on the drill bit may be adjusted.

The prior art has addressed bit whirl and weight on bit issues. Such issues have been addressed in the U.S. Pat. No. 6,443,249 to Beuershausen, which is herein incorporated by reference for all that it contains. The '249 patent discloses a PDC-equipped rotary drag bit especially suitable for directional drilling. Cutter chamfer size and backrake angle, as well as cutter backrake, may be varied along the bit profile between the center of the bit and the gage to provide a less aggressive center and more aggressive outer region on the bit face, to enhance stability while maintaining side cutting capability, as well as providing a high rate of penetration under relatively high weight on bit.

U.S. Pat. No. 6,298,930 to Sinor which is herein incorporated by reference for all that it contains, discloses a rotary drag bit including exterior features to control the depth of cut by cutters mounted thereon, so as to control the volume of formation material cut per bit rotation as well as the torque experienced by the bit and an associated bottomhole assembly. The exterior features preferably precede, taken in the direction of bit rotation, cutters with which they are associated, and provide sufficient bearing area so as to support the bit against the bottom of the borehole under weight on bit without exceeding the compressive strength of the formation rock.

U.S. Pat. No. 6,363,780 to Rey-Fabret which is herein incorporated by reference for all that it contains, discloses a system and method for generating an alarm relative to effective longitudinal behavior of a drill bit fastened to the end of a tool string driven in rotation in a well by a driving device situated at the surface, using a physical model of the drilling process based on general mechanics equations. The following steps are carried out: the model is reduced so to retain only pertinent modes, at least two values Rf and Rwob are calculated, Rf being a function of the principal oscillation frequency of weight on hook WOH divided by the average instantaneous rotating speed at the surface, Rwob being a function of the standard deviation of the signal of the weight on bit WOB estimated by the reduced longitudinal model from measurement of the signal of the weight on hook WOH, divided by the average weight on bit defined from the weight of the string and the average weight on hook. Any danger from the longitudinal behavior of the drill bit is determined from the values of Rf and Rwob.

U.S. Pat. No. 5,806,611 to Van Den Steen which is herein incorporated by reference for all that it contains, discloses a device for controlling weight on bit of a drilling assembly for drilling a borehole in an earth formation. The device includes a fluid passage for the drilling fluid flowing through the drilling assembly, and control means for controlling the flow resistance of drilling fluid in the passage in a manner that the flow resistance increases when the fluid pressure in the passage decreases and that the flow resistance decreases when the fluid pressure in the passage increases.

U.S. Pat. No. 5,864,058 to Chen which is herein incorporated by reference for all that is contains, discloses a downhole sensor sub in the lower end of a drillstring, such sub having three orthogonally positioned accelerometers for measuring vibration of a drilling component. The lateral acceleration is measured along either the X or Y axis and then analyzed in the frequency domain as to peak frequency and magnitude at such peak frequency. Backward whirling of the drilling component is indicated when the magnitude at the peak frequency exceeds a predetermined value. A low whirling frequency accompanied by a high acceleration magnitude based on empirically established values is associated with destructive vibration of the drilling component. One or more drilling parameters (weight on bit, rotary speed, etc.) is then altered to reduce or eliminate such destructive vibration.

BRIEF SUMMARY OF THE INVENTION

In one aspect of the invention a drill bit assembly has a body portion intermediate a shank portion and a working portion. The working portion has a recess with a side wall. The recess may be substantially coaxial with the shank portion. At least one cutting element is attached to the side wall and an indenting member is supported by the closed end. The shank portion may be adapted for connection to a downhole tool string, such that the drill bit assembly is adapted to drill through a subsurface formation; however, the drill bit assembly may be adapted to drill through metal, wood, concrete and/or plastic. The indenting member may have a superhard material which may be diamond, polycrystalline diamond or cubic boron nitride. The indenting member may be rotationally isolated from the body portion, be spring loaded, be an insert, be substantially coaxial with the shank portion, or combinations thereof. The indenting member may be secured within the recess with a bolt, a braze, a threadform, an adhesive, a fastener, or combinations thereof. In some embodiments, the indenting member may comprise flutes, which may aid in breaking up a portion of a subsurface formation or aid in rotationally isolating the indenting member in embodiments where the indenting member is supported on a bearing.

The recess may be adapted to cut a conical profile in a subsurface formation and the indenting member may be adapted to break up the conical profile. In such embodiments, the indenting member may direct at least a portion of the conical profile towards the at least one cutting element, which may increase the drilling rate of penetration. The cutting elements may comprise a superhard material which may be diamond, polycrystalline diamond, or cubic boron nitride. In some embodiments of the invention, the cutting element is a shearing element.

In another aspect of the invention a method includes providing a drill bit assembly with a recess formed in a working portion of the assembly. The working portion has a plurality of cutting elements and the recess has a side wall with at least one cutting element. The method further has a step of cutting a formation with the plurality of cutting elements by engaging the formation with the working portion and rotating the drill bit assembly. The method has another step of breaking up a conical profile formed in the formation by the recess by penetrating the conical profile with an indenting member which is supported within the recess. During the step of cutting the formation, at least a portion of the weight of the tool string loaded to the working portion may be transferred to the indenting member. Further, during the step of breaking up the profile formed in the formation, at least a portion of the weight of the tool string loaded to the indenting member may be transferred to the working portion. The formation may be an earth formation, a metal formation, a wood formation, a concrete formation, or a plastic formation.

DETAILED DESCRIPTION OF THE INVENTION AND THE PREFERRED EMBODIMENT

Figure 1:
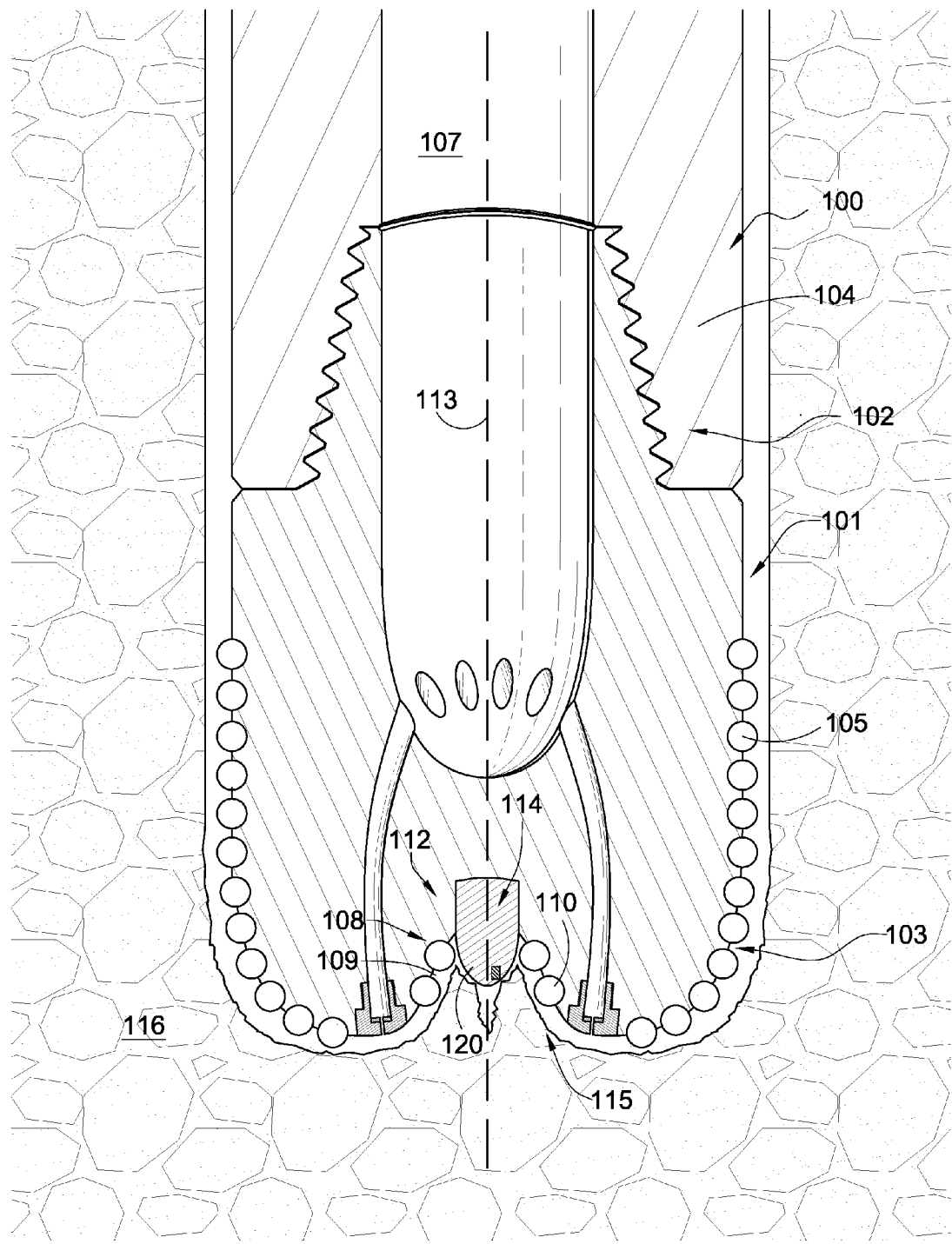
FIG. 1 is a cross sectional diagram of an embodiment of a drill bit assembly.

FIG. 1 is a cross sectional diagram of an embodiment of a drill bit assembly 100. The assembly 100 comprises a body portion 101 intermediate a shank portion 102 and a working portion 103. The shank portion 102 is connected to a component 104 of a downhole tool string. The working portion 103 comprises a plurality of cutting elements 105, preferably comprising polycrystalline diamond. A least one nozzle 106 is attached to the working portion 103 and is in communication with a bore 107 of the downhole tool string. The working portion 103 also comprises a recess 108. The side wall 109 of the recess 108 comprises at least one cutting element 110, as shown in FIG. 1, the cutting element is a shearing element. Preferably the cutting element 110 is also comprises polycrystalline diamond. In some embodiments of the invention, the shearing cutting 110 and/or the plurality of cutting elements 105 may comprise another superhard material such as diamond or cubic boron nitride. In a closed end 111 of the recess 108 an indenting member 112 is attached. The indenting member 112 shown in FIG. 1 substantially shares a central axis 113 with the shank portion 102 and/or body portion 101 of the drill bit assembly 100. Still referring to FIG. 1, the indenting member 112 is an insert 114 bonded to the closed end 111 of the recess 108, preferably by brazing; however, the insert 114 may be bonded by a weld or an adhesive. In some embodiments, the insert 114 may be held within the recess 108 by a fastener such as a bolt or a screw. A distal end 120 of the indenting member may be within the recess 108.

The drill bit assembly 100 of FIG. 1 is a shear bit, although in other embodiments the assembly 100 may be a roller cone bit, an impregnated bit, and/or a bi-center bit. The indenting member 112 may be made of steel, stainless steel, a cemented metal carbide, or a composite. The indenting member 112 may be made of a metal with a similar electric potential as the metal of the body portion 101 to avoid galvanic corrosion. In some embodiments of the present invention, the indenting member 112 may comprise cutting features such as flutes, edges, or inserts of superhard material.

As the drill bit assembly 100 rotates, the recess 108 may form a conical profile 115 in a subsurface formation 116. The indenting member 112 is adapted to break up the profile 115 and may stabilize the drill bit assembly 100 by reducing bit whirl. In soft formations, the majority of the weight of the tool string may be loaded to the working portion 103 of the drill bit assembly 100, but in harder formations at least a portion of the weight may be loaded to the indenting member 112, which may reduce damage to the plurality of cutting elements 105.

Figure 2:
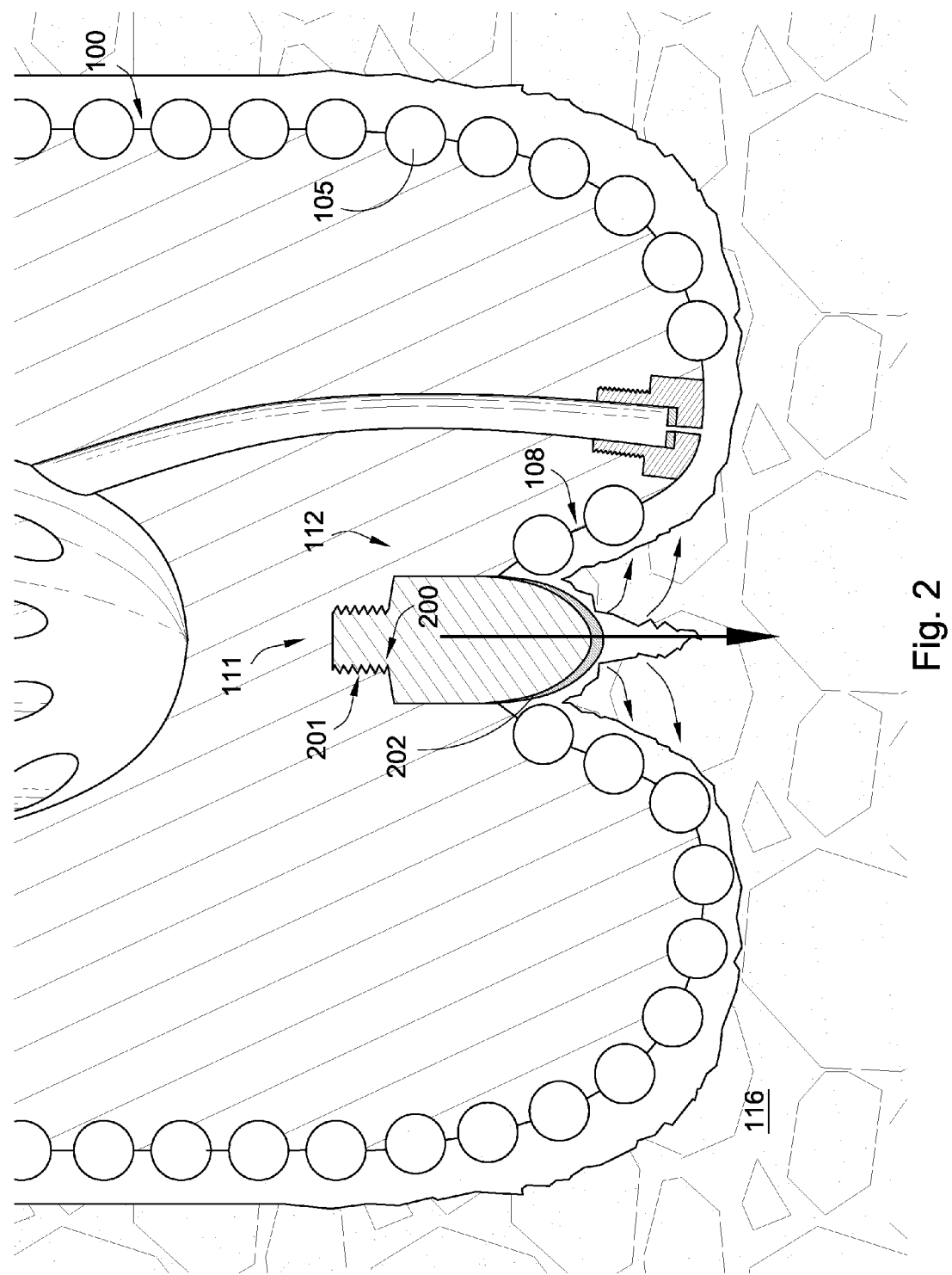
FIG. 2 is a cross sectional diagram of an embodiment of a drill bit assembly with an indenting member with a threadform.

FIG. 2 is a cross sectional diagram of another embodiment of a drill bit assembly 100. The indenting member 112 comprises a threadform 200 which is received by a complementary threadform 201 in the closed end 111 of the recess 108. The indenting member 112 may be coated with a superhard material 202, such as diamond. The superhard material 202 may reduce wear and be corrosion resistant. The indenting member 112 may load the weight of the tool string to the conical profile 115 and break it up. As shown in FIG. 2 at least a portion of the conical profile 115 is directed into the at least one cutting element 110. This may be advantageous since a cutting element 110 attached at or near the axis of rotation may be less effective than cutting elements 105 located away from the axis of rotation. In this manner the formation 116 at and/or near the axis of rotation may be removed by the drill bit assembly 100 faster than prior art drill bit assemblies, thus increasing the rate of penetration.

An indenting member 112 comprising a threadform 200 may be advantageous since it may allow quick replacement of the indenting member 112. In addition to replacing damaged indenting members, it may be advantageous to use indenting members of varying widths, sizes, lengths, and/or geometries depending on the type of formation.

Figure 3:
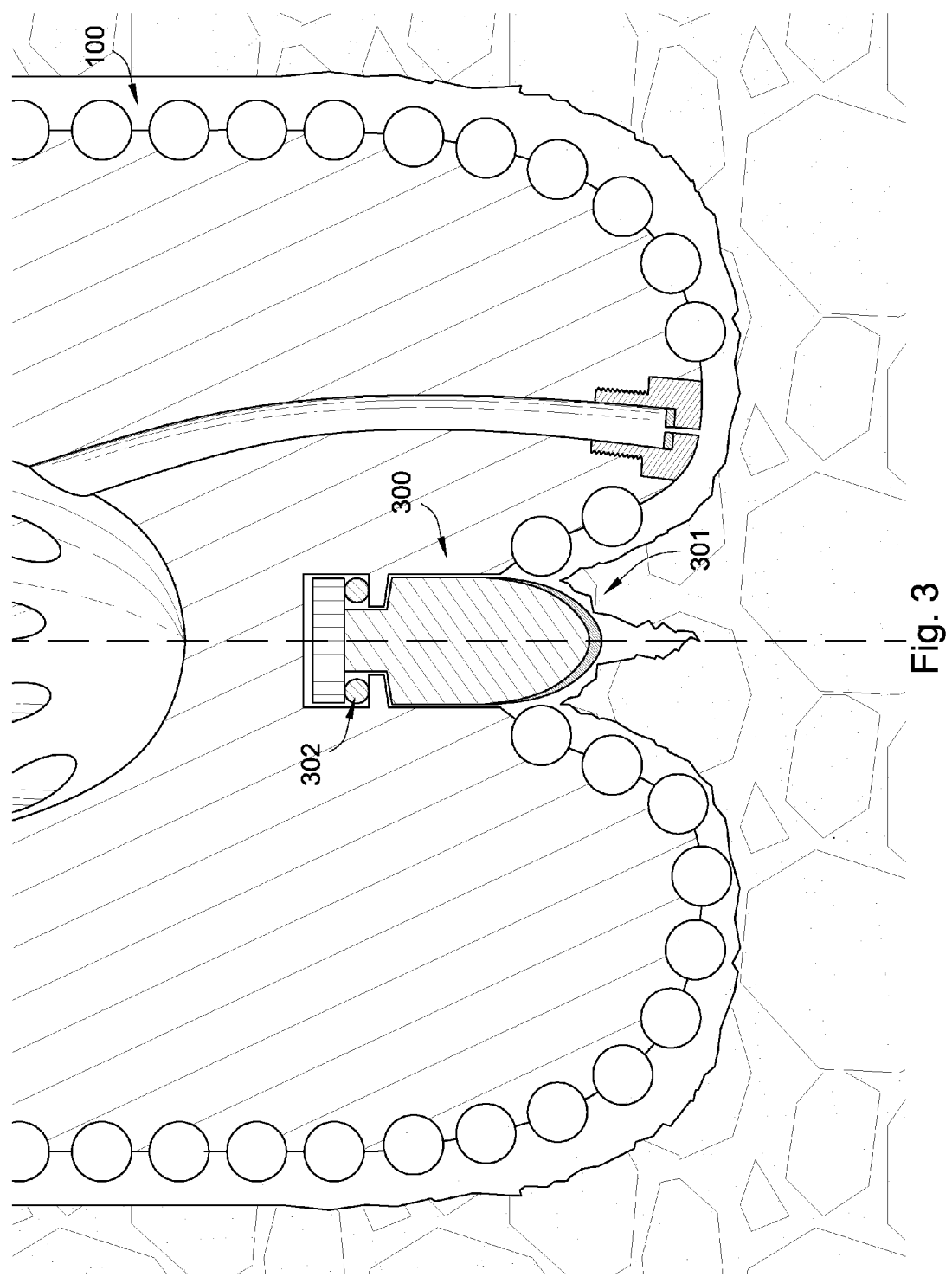
FIG. 3 is a cross sectional diagram of an embodiment of a drill bit assembly with a rotationally isolated indenting member.

FIG. 3 is a cross sectional diagram of an embodiment of a drill bit assembly 100 with a rotationally isolated indenting member 300. In some embodiments, just the distal end 301 of the indenting member 300 is rotationally isolated. Rotational isolation may be accomplished by providing a rotary bearing 302 comprising ball bearings, roller bearings, plain bearings, taper bearing, or combinations thereof. The bearings 302 may be made of steel, stainless steel, carbide, diamond, silicon nitride, or other ceramics. A rotationally isolated indenting member 300 may further reduce bit whirl and also reduce wear on the indenting member 300.

Figure 4:
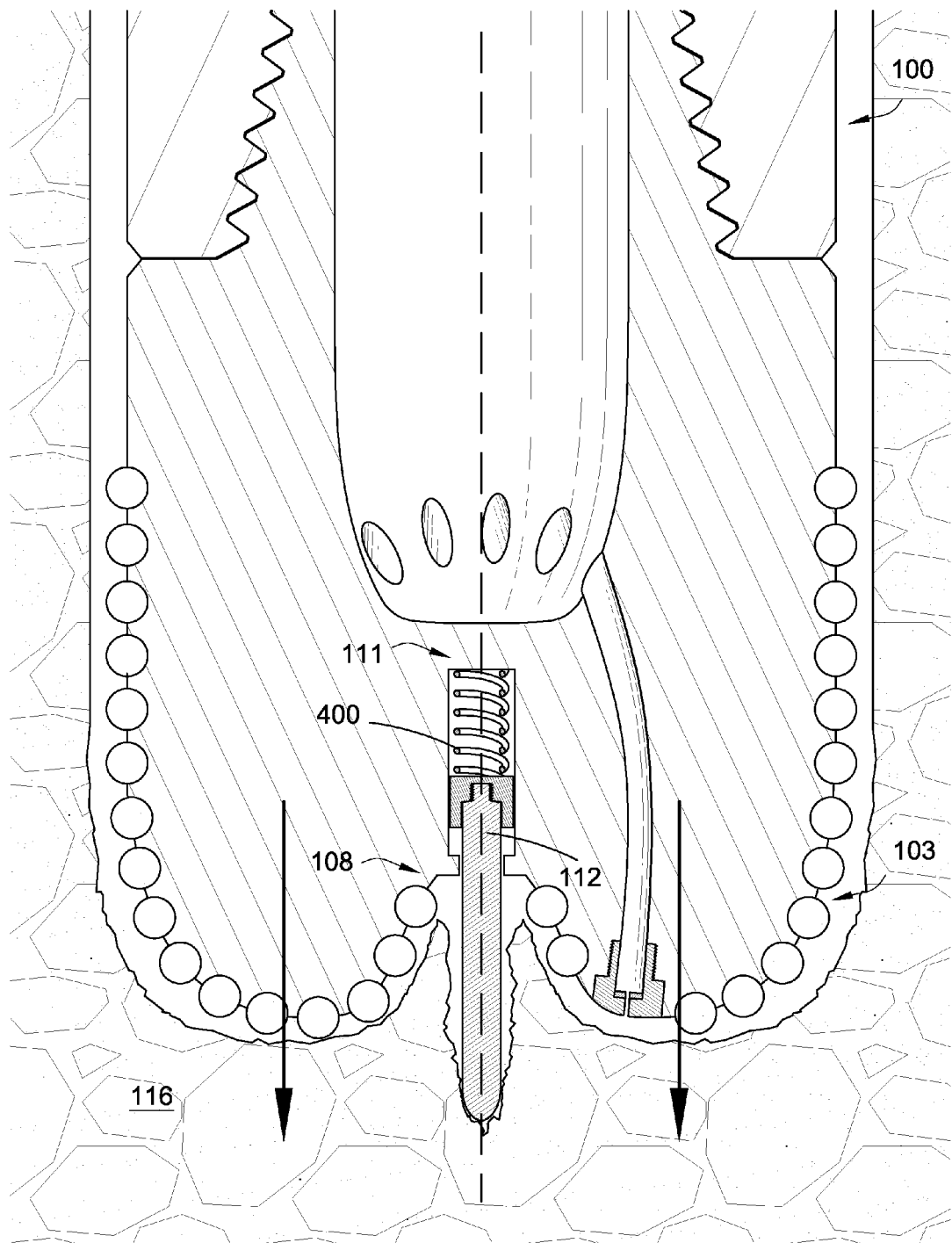
FIG. 4 is a cross sectional diagram of an embodiment of a drill bit assembly with a spring loaded indenting member.

FIG. 4 is a cross sectional diagram of another embodiment of a drill bit assembly 100. In this embodiment, the indenting member 112 is spring loaded. The spring 400 may be secured within the closed end 111 of the recess 108. In soft formations, the indenting member 112 may extend a maximum length into the formation 116 and the majority of the weight of the tool string may be loaded to the working portion 103. This may be advantageous since a hard formation may be encountered suddenly and may resist the indenting member 112, thereby loading a greater portion of the weight of the tool string to the indenting member 112 and reducing the amount of weight loaded to the working portion 103. An automatic reaction as just described may reduce damage to the drill bit assembly 100 when hard formations are encountered suddenly.

Figure 5:
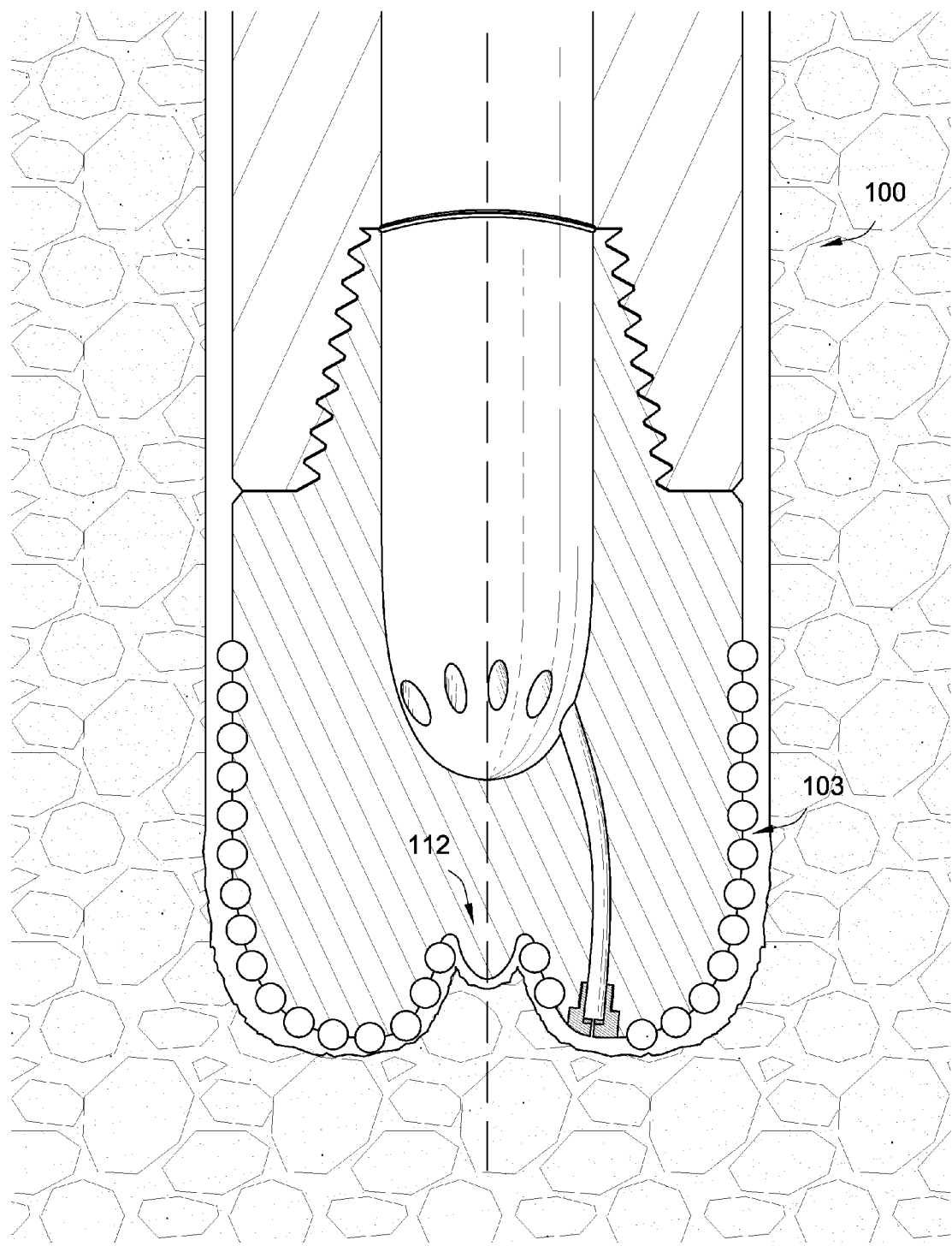
FIG. 5 is a cross sectional diagram of an embodiment of a drill bit assembly with an indenting member formed in the recess.

FIG. 5 is a cross sectional diagram of another embodiment of a drill bit assembly 100. The indenting member 112 is formed in the recess of the working portion 103. The indenting member 112 may be milled or molded in place during manufacturing.

FIGS. 6-17 show various embodiments with various geometries and dimensions of indenting members 112. It is believed that various geometries, lengths, and widths may have various advantages depending on the hardness and type of a subsurface formation and or/other material.

Figure 6:
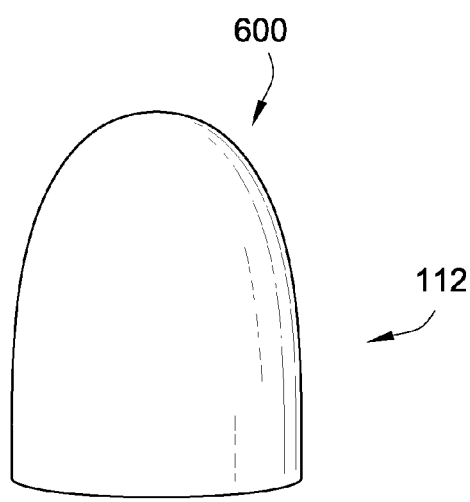
FIG. 6 is a perspective diagram of an embodiment of a rounded indenting member.
Figure 7:
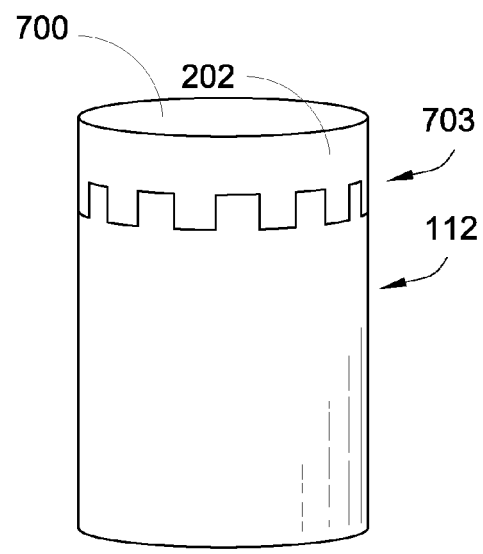
FIG. 7 is a perspective diagram of an embodiment of an indenting member with a substantially flat face.
Figure 8:
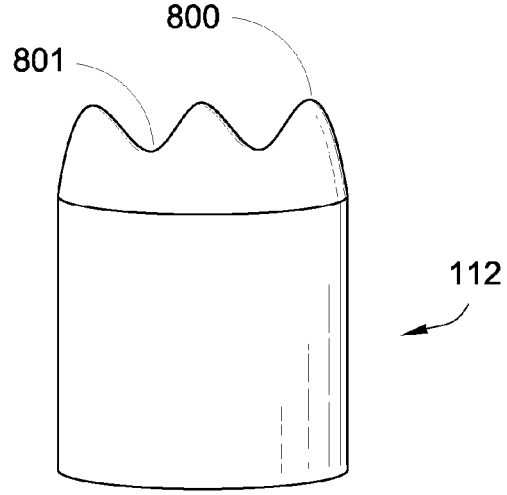
FIG. 8 is a perspective diagram of an embodiment of an indenting member with a plurality of peaks.
Figure 9:
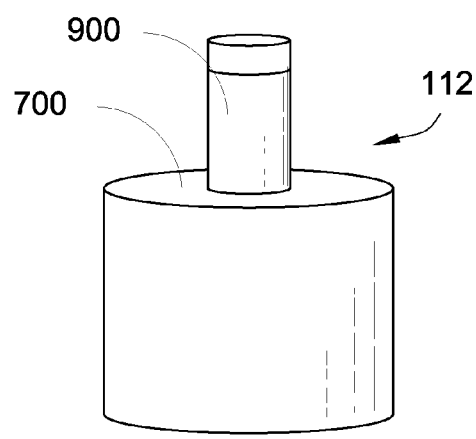
FIG. 9 is a perspective diagram of an embodiment of an indenting member with a raised portion of a substantially flat face.

FIG. 6 is a perspective diagram of an embodiment of an indenting member 112 with a rounded distal end 600. The flute 650 may aid in removal of debris. FIG. 7 is a perspective diagram of an embodiment of an indenting member 112 with a substantially flat face 700. A superhard material 202 is bonded to the indenting member 112 with a non-planar interface 703. FIG. 8 shows an indenting member 112 with a plurality of peaks 800. In soft formations, the formation may push up against the peaks 800 and the troughs 801, where in harder formations; the formation may push up more on the peaks 800. FIG. 9 shows an indenting member 112 with a raised portion 900 of a substantially flat face 700. In harder formations, the weight of the tool string may be loaded to only the raised portion 900 helping to focus a high compressive force to the conical profile.

Figure 10:
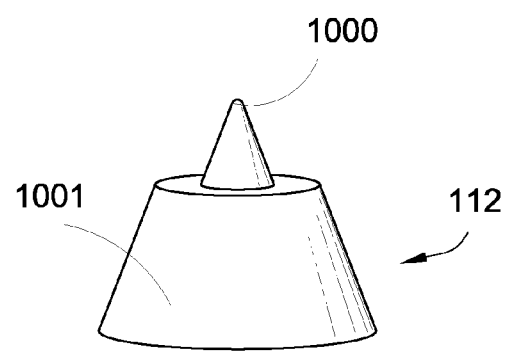
FIG. 10 is a perspective diagram of an embodiment of an indenting member with a tip.
Figure 11:
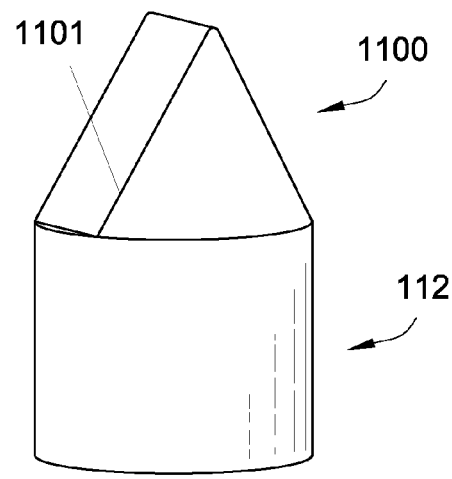
FIG. 11 is a perspective diagram of an embodiment of an indenting member with a generally triangular distal end.
Figure 12:
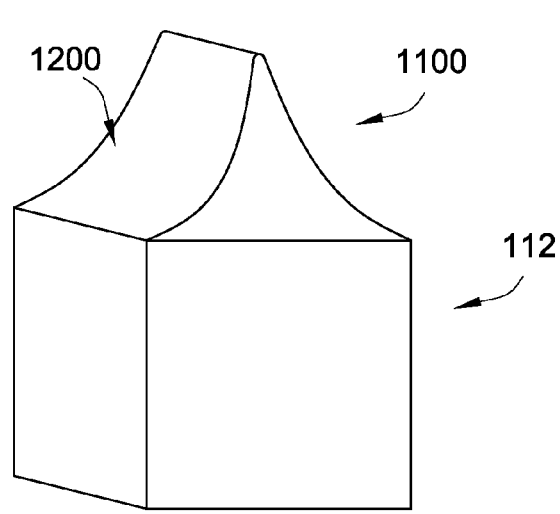
FIG. 12 is a perspective diagram of an embodiment of an indenting member with a concave portion.
Figure 13:
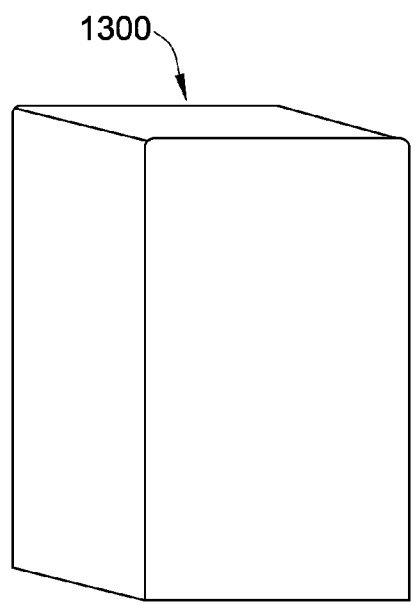
FIG. 13 is a perspective diagram of an embodiment of a generally square indenting member.

FIG. 10 is a perspective diagram of an embodiment of an indenting member 112 with a tip 1000. The tip 1000 protrudes from a frustum 1001. FIG. 11 shows an indenting member 112 with a generally triangular distal end 1100. The edges 1101 of the triangular distal 1100 end may help either fix a rotationally isolated indenting member to the formation or it may help form a portion of the conical profile. FIG. 12 shows another embodiment of an indenting member 112 with a concave portion 1200 on a triangular distal end 1100. The concave portions 1200 may help to focus the load to the conical profile. FIG. 13 is a perspective diagram of an embodiment of a generally square indenting member 1300.

Figure 14:
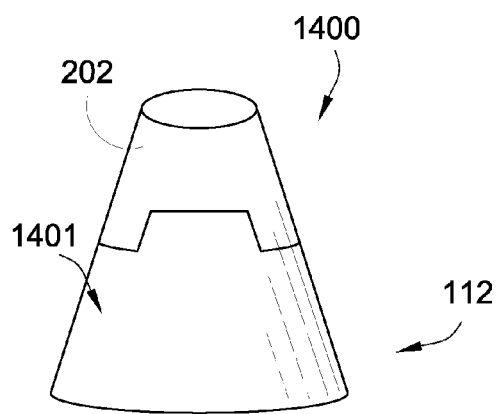
FIG. 14 is a perspective diagram of an embodiment of an indenting member comprising a frustum.
Figure 15:
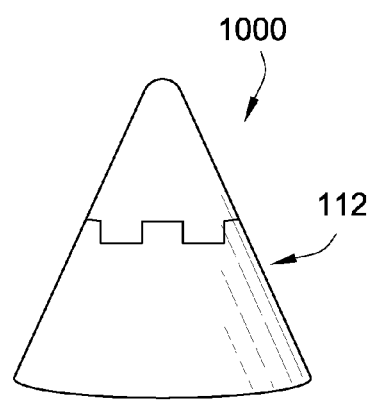
FIG. 15 is a perspective diagram of another embodiment of an indenting member with a tip.
Figure 16:
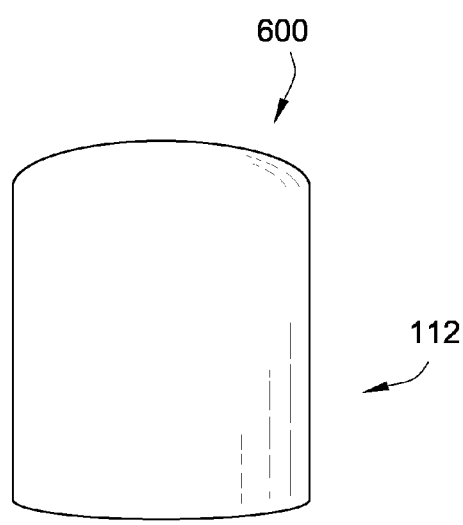
FIG. 16 is a perspective diagram of another embodiment of a rounded indenting member.
Figure 17:
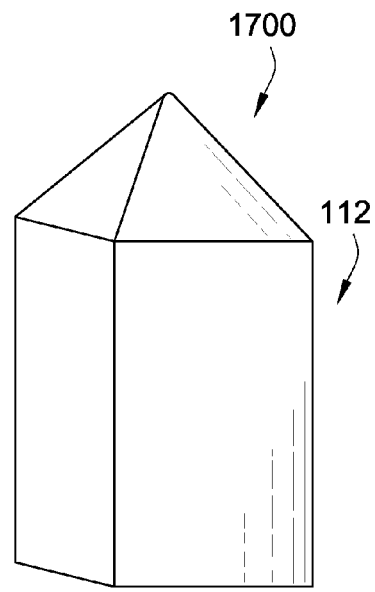
FIG. 17 is a perspective diagram of an embodiment of an indenting member with a generally pyramidal distal end.

FIG. 14 is a perspective diagram of an embodiment of an indenting member 112 comprising a frustum 1401 with a superhard material 202 bonded to its distal end 1400. FIG. 15 is a perspective diagram of another embodiment of an indenting member 112 with a tip 1000. FIG. 16 shows another embodiment of an indenting member 112 with a rounded distal end 600. FIG. 17 shows an indenting member 112 with a generally pyramidal distal end 1700.

Figure 18:
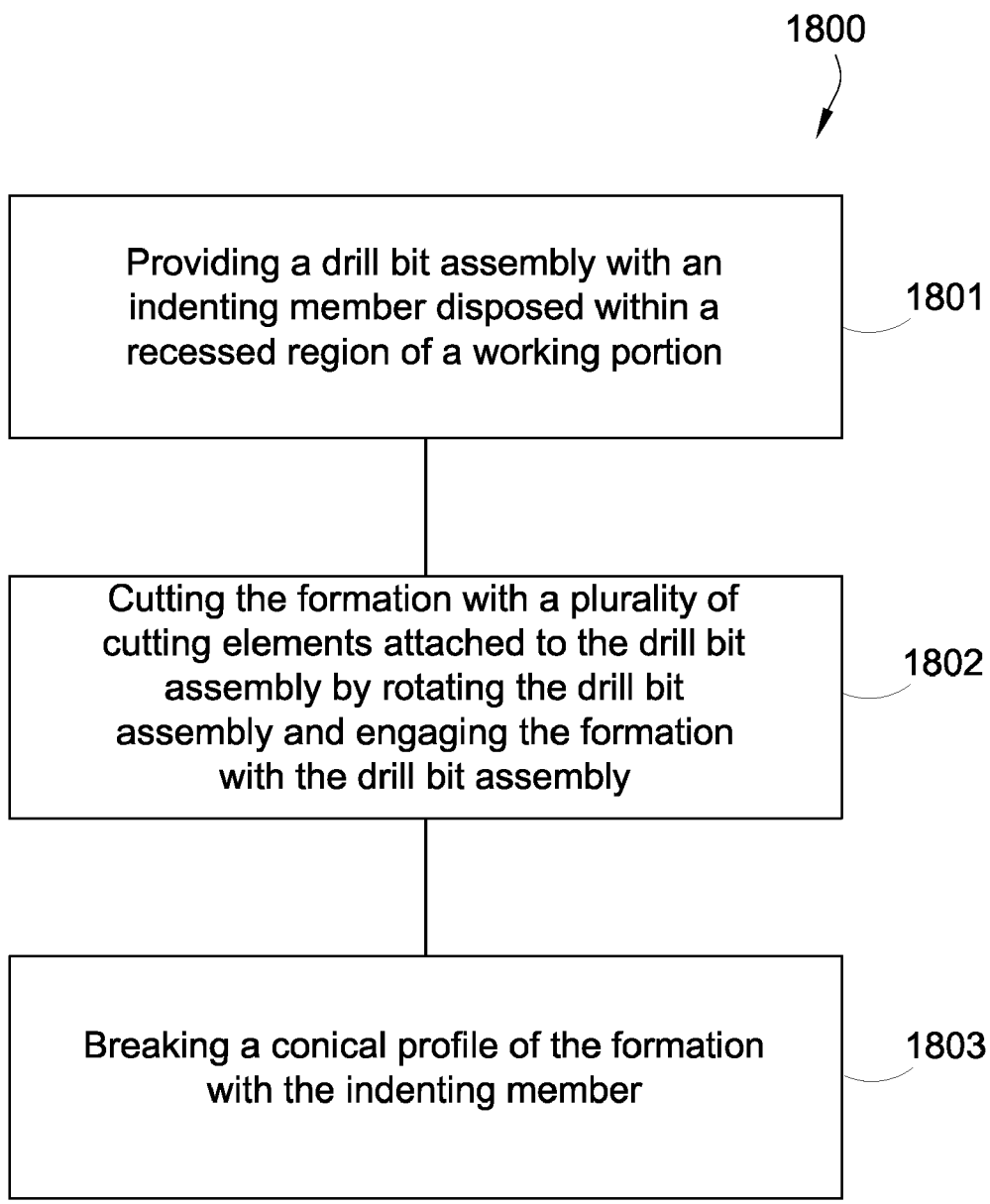
FIG. 18 is a diagram of a method for drilling through a formation.

FIG. 18 is a diagram of a method 1800 for drilling through a formation. The steps include providing 1801 a drill bit assembly with a recess formed in a working portion of the assembly, the working portion comprising a plurality of cutting elements and the recess comprising a side wall with at least one cutting element; cutting 1802 the formation with a plurality of cutting elements attached to the drill bit assembly by rotating the drill bit assembly and engaging the formation with the drill bit assembly; and breaking up 1803 a profile of the formation with an indenting member. The indenting member may direct at least a portion of the conical profile into at least one cutting element attached within the recess. During the step of cutting the formation, at least a portion of the weight of the tool string loaded to the working portion may be transferred to the indenting member. During the step of breaking up the conical profile formed in the formation, at least a portion of the weight of the tool string loaded to the indenting member may be transferred to the working portion.

Whereas the present invention has been described in particular relation to the drawings attached hereto, it should be understood that other and further modifications apart from those shown or suggested herein, may be made within the scope and spirit of the present invention.

What is claimed is:

1. A downhole rotary shear bit, comprising:
    an axis of rotation;
    a working surface opposite a shank of the bit, the working surface comprising a plurality of cutting elements;
    an indenting member coaxial with the axis of rotation and protruding from a recess in the working surface, the indenting member being an insert bonded within a closed portion of the recess;
    the insert comprising a cemented metal carbide material and comprising a rounded distal end; and
    the indenting member comprises a distal end that is the distal end is rotationally isolated from the working surface.

2. The bit of claim 1, wherein the cutting elements comprise a superhard material selected from the group consisting of diamond, polycrystalline diamond, and cubic boron nitride.

3. The bit of claim 1, wherein the recess is adapted to form a conical profile in a subsurface formation.

4. The bit of claim 3, wherein the indenting member is adapted to break up the conical profile.

5. The bit of claim 3, wherein the indenting member is adapted to direct at least a portion of the conical profile towards the at least one of the plurality of cutting elements.

6. The bit of claim 1, wherein the indenting member is secured within the recess with, a weld, a braze, an adhesive, or combinations thereof.

7. The bit of claim 1, wherein a material of the indenting member comprises an electric potential substantially equal to a body of the rotary bit.

8. The bit of claim 1, wherein the indenting member comprises diamond.

9. The bit of claim 1, wherein a distal end of the indenting member is within the recess.

10. The bit of claim 1, wherein a distal end of the indenting member extends beyond the recess.

11. The bit of claim 1, wherein the portion of the working surface to which the cutting elements are attached converge adjacent the indenting member and diverge radially outward towards a gauge of the bit.

* * * * *